3,420,867
N,N'-SULFONYL BIS(ARYL CARBAMATES)
AND (THIOCARBAMATES)
John J. Kohler, Branford, Conn., and Louis A. Ross, Phillipsburg, N.J., assignors to The Ansul Company, a corporation of Wisconsin
No Drawing. Filed Aug. 25, 1966, Ser. No. 574,934
U.S. Cl. 260—455   7 Claims
Int. Cl. C07c *155/02;* C07c *147/00;* C07c *125/06*

This invention relates to certain N,N'-sulfonyl bis(aryl carbamates) and (aryl thiocarbamates and their use in agricultural control methods. The term "aryl carbamates" as used herein is intended to include the corresponding aryl thiocarbamates. More particularly, the sulfonyl compounds of this invention have the formula:

$$SO_2(NH.COXA)_2$$

where X is oxygen or sulfur and A is monovalent aryl. The aryl can be monocyclic, bicyclic or polycyclic and the rings can be condensed or extended, for example, in 1-naphthyl or 4-biphenyl. Other examples of suitable monovalent aryl are phenyl, 2-naphthyl and phenanthryl. Monovalent aryl also suitably include substituted aryl, for example, 2-chlorophenyl, 3-nitrophenyl, 4-bromophenyl, 3-methylphenyl, 2,4-dibromo-1-naphthyl, 1-chloro-2-naphthyl, 5-nitro-2-naphthyl and 2-, 3-, 4- or 9-phenanthryl.

The compounds of this invention are prepared by the reaction of sulfuryl isocyanate with the selected phenol or thiophenol in the presence or absence of inert diluent. Conveniently the phenol or thiophenol dissolved or suspended in the inert diluent is added to a mixture of sulfuryl isocyanate in the inert diluent. The reverse order of addition is also suitable. Cooling is usually appropriate during the addition followed by a period of refluxing for 1 to 10 hours. The product usually separates as a solid which is removed by filtration. Other methods of separation are used when appropriate. Oils are separated and/or extracted followed by distillation and/or crystallization.

Suitable inert diluents are well-known to those skilled in the art and include, for example, petroleum ether, ethyl ether, methyl isopropyl ether, di-isopropyl ether, benzene, toluene, chlorobenzenes and tetrachloroethane.

Some aliphatic sulfonyl bis(carbamates) have previously been prepared by Onodera, Chem. Abst., 57, 14932 (1962) and he also prepared polymeric sulfonyl bis(carbamates) from certain dihydric phenols, Chem. Abst. 60, 673 (1964).

The compounds of this invention, appropriately diluted and applied, are useful as herbicides, both pre-emergence and post-emergence, mildewicides and fungicides but are especially outstanding as nematocides.

In use these compounds are applied to areas to be protected from nematodes in any of a variety of formulations. Preferably the compounds are extended with carriers or conditoning agents of the kind used and commonly referred to in the art as adjuvants or modifiers. Such adjuvants are inert solids, surface-active agents and organic liquids.

The bis(carbamate) compounds shown above are incorporated in such compositions in sufficient amount to exert a nematocidal effect. Usually from about 1 to 95% by weight of the compounds are included in such formulations.

Solid formulations are prepared with inert powders. The formulations thus prepared are used as such, diluted further with inert solids to form dusts, or suspended in a suitable liquid medium for spray application.

The powders usually comprise the active ingredient admixed with minor amounts of conditioning agents. Natural clays (either absorptive such as attapulgite or relatively non-absorptive such as china clays), diatomaceous earth, walnut shell flour, redwood flour, synthetic fine silica, calcium silicate and other inert solid carriers of the kind conventionally employed in powder formulations are used. Industrial fertilizers and dry soil can sometimes be used.

The active ingredient usually amounts to about 1 to 95% by weight of these powder compositions. The solids ordinarily should be very finely divided and should have a particle size below about 50 microns and preferably below about 20 microns. For conversion of the powders to dust formulations, talc, pyrophyllite, tobacco dust, volcanic ash and other dense, rapid-settling inert solids customarily are used.

Liquid compositions including the active compounds above described are prepared by mixing the compound with a suitable liquid diluent medium. The active compound is either in solution or in suspension in the liquid medium. Typical liquid media are kerosene, Stoddard solvent, xylene, alcohols, alkylated naphthalenes, diesel oil, glycols and ketones, for example, diisobutyl ketone and cyclohexanone. The active ingredient usually makes up from about 0.5 to 50% of these liquid compositions. Some of these compositions are designed to be used as such, and other to be extended or emulsified with large quantities of water.

Nematocidal compositions in the form of wettable powders or liquids also suitably include one or more surface-active agents, for example, wetting, dispersing, or emulsifying agents. Thus mixtures of the above liquids with the active compounds suitably contain an emulsifying agent to make an emulsifiable composition. The surface-active agents cause the compositions to disperse or emulsify easily in water to give aqueous sprays. Generally the surface-active agents do not comprise more than 5 to 10% by weight of a composition and in some compositions the percentage is considerably less than 1%.

The surface-active agents employed are suitably of the anionic, cationic, or nonionic type. They include for example, sodium oleate, sulfonated petroleum oils, alkyl aryl sulfonates, sodium lauryl sulfate, polyethylene oxides, lignin sulfonates, and other surface-active agents. A detailed list of such agents is set forth by McCutcheon in "Soap and Chemical Specialties," volume 31, Nos. 7–10 (1955).

In general, the nematocidal compositions are applied to cultivated land and mixed with top soil. The active compound or compounds present in the compositions are applied in an amount sufficient to exert the desired nematocidal action. The exact dosage necessary depends on the particular active ingredient or ingredients employed, the nature of the formulation used, the type of treatment, the type and quantity of nematodes to be controlled, duration of treatment desired climatic conditions and the like. Application rates of from 1 to 50 pounds per acre generally are satisfactory for nematode control, although higher rates are also useful. After application, the compounds are preferably worked into the ground to a depth of 4 to 6 inches.

EXAMPLE I (A) Preparation of N,N'-sulfonyl bis(phenyl carbamate)

A 500 ml. three-necked flask equipped with a magnetic stirrer, addition funnel, reflux condenser and a $CaSO_4$ drying tube was charged with 14.8 g. (0.1 mole) of sulfuryl diisocyanate and 200 ml. of dry diethyl ether. The mixture was cooled to 0° C. and a solution of 18.8 g. (0.2 mole) of phenol in 125 ml. of dry diethyl ether was added to the slowly stirred solution during one hour while the reaction temperature was maintained at 0 to 10° C. No solid separated during the addition and the reaction mixture remained clear and colorless. After standing for 18 hours at room temperature, the reaction mixture deposited 8.27 g. of transparent while needles, isolated by filtration. Concentration of the filtrate yielded an additional 20.35 g. of product. The product melted sharply at 153.0–153.5° C. with no apparent decomposition. The following analytical data revealed that N,N'-sulfonyl bis(phenyl carbamate) was obtained. Yield: 85%.

*Analysis.*—For $C_{14}H_{12}N_2SO_6$: Calc.: C, 50.00; H, 3.60; N, 8.33; S, 9.53%. Found: C, 49.87, 49.71%; H, 3.64, 3.69; N, 8.41, 8.52; S, 10.03, 9.62%.

(B) Nematode tests

Treated soil was prepared by mixing 0.5 gram of N,N'-sulfonyl bis(phenyl carbamate) with one gallon of soil. Flats were prepared with treated and untreated soil. Both were inoculated with Meloidogyne spp., the common root knot nematode.

A group of transplanted tomato plants were planted in treated and untreated soil and were examined after one month's growth. There were no galls on the plants growing in the treated soil but the plants growing in the untreated soil showed 50 to 100% of the roots bearing galls. Otherwise, the condition of the roots, tops and the height of the plants were normal.

Cucumber seedlings similarly grown in treated and untreated soil showed 50 to 100% of the roots bearing galls in the untreated soil, none in the treated soil.

EXAMPLE II (A) Preparation of N,N'-sulfonyl bis(phenyl thiocarbamate)

A 500 ml. three-necked flask equipped with a magnetic stirrer, addition funnel, reflux condenser and a $CaSO_4$ drying tube was charged with 14.8 g. (0.1 mole) of sulfuryl diisocyanate and 200 ml. of dry diethyl ether. The mixture was cooled to 0° C. and a solution of 22.0 g. (0.2 mole) of thiophenol in 125 ml. of dry diethyl ether was added to the slowly stirred solution during one hour while the reaction temperature was maintained at 0 to 10° C. No solid separated during the addition. The reaction mixture acquired a slight yellow coloration but remained clear. After standing for 18 hours at room temperature, the reaction mixture deposited 19.65 g. of white solid, isolated by filtration, washed with fresh, cold diethyl ether and vacuum dried. The combined filtrate and washings were concentrated almost to dryness and an additional 15.33 g. of yellow product was obtained. The yellow color was easily removed by washing with fresh cold diethyl ether. The product melted at 144–145° C. with decomposition. The following analytical data revealed that N,N'-sulfonyl bis(phenyl thiocarbamate) was obtained. Yield: 96%.

*Analysis.*—For $C_{14}H_{12}N_2S_3O_4$: Calc.: C, 45.64; H, 3.28; N, 7.60; S, 26.11%. Found: C, 45.50, 45.60; H, 3.48, 3.66; N, 7.89, 7.74; S, 25.80, 26.05%.

(B) Nematode tests

Tested as described in Example I, 0.5 gram of N,N'-sulfonyl bis(phenyl thiocarbamate) per gallon of soil prevented gall formation on the roots of tomato and cucumber plants growing in treated soil while 50 to 100% of the roots of plants growing in untreated soil bore galls.

EXAMPLE III (A) Preparation of N,N'-sulfonyl bis(1-naphthyl carbamate)

A 500 ml, three-necked flask equipped with a magnetic stirrer, addition funnel, reflux condenser and a $CaSO_4$ drying tube was charged with 15.1 g. (0.102 mole) of sulfuryl diisocyanate and 100 ml. of dry benzene. The mixture was cooled to 0° C. and a solution of 29.4 g. (0.204 mole) of 1-naphthol in a mixture of 100 ml. of dry benzene and 150 ml. of dry diethyl ether was added to the slowly stirred solution during 45 minutes while the reaction temperature was maintained at 0 to 10° C. No solid separated during the addition. The reaction mixture was stirred for two hours at room temperature and then the volume was reduced to one-half under reduced pressure. This concentration resulted in the separation of 34.6 g. of off-white solid. The combined crude products were dissolved in fresh dry diethyl ether and precipitated by the addition of carbon tetrachloride. The precipitated product was then recrystallized from diethyl ether to give a white solid with a melting point of 145° C. The following analytical data revealed that N,N'-sulfonyl bis(1-naphthyl carbamate) was obtained. Yield: 88%.

*Analysis.*—For $C_{22}H_{16}N_2SO_6$: Calc.: C, 60.54; H, 3.69; N, 6.42; S, 7.34%. Found: C, 60.20, 60.43; H, 3.60, 3.65; N, 6.22, 6.17; S, 7.41, 7.50%.

(B) Nematode test

Tested as described in Example I, the tomato roots showed 0 to 25% galls in the soil treated with 0.5 gram of the compound of Example III (A) per gallon of soil but 50 to 100% galls in the untreated soil.

(C) Foliar fungicide

Tested against a broad spectrum of fungi using an aqueous suspension of 1000 p.p.m. of the product of Example III (A) 78% control was obtained. Using the sand drench method for systemic foliar fungicides at the same rate, control was 89.5%.

EXAMPLE IV (A) Preparation of N,N'-sulfonyl bis(2-naphthyl thiocarbamate)

A 250 ml. three-necked flask equipped with a magnetic stirrer, addition funnel, reflux condenser and a $CaSO_4$ drying tube was charged with 14.8 g. (0.1 mole) of sulfuryl diisocyanate and 100 ml. of dry diethyl ether. The mixture was cooled to 0° C. and a solution of 32.0 g. (0.2 mole) of 2-naphthalenethiol in 140 ml. of dry diethyl ether was added to the slowly stirred solution during 30 minutes. The reaction temperature was maintained at 0 to 10° C. No solid separated during the addition. After standing for 18 hours at room temperature, 33.96 g. of an off-white solid separated and was isolated by filtration. Concentration of the filtrate to half its volume produced an additional 11.9 g. of solid. The combined products were purified by precipitation from diethyl ether by the addition of petroleum ether (B.P. 65–110° C.) The purified product on a preheated block melted at 150–152° C. The following analytical data revealed that N,N'-sulfonyl bis(2-naphthyl thiocarbamate) was obtained. Yield: 95%.

*Analysis.*—For $C_{22}H_{16}N_2S_3O_4$: Calc.: C, 56.38; H, 3.44; N, 5.96; S, 20.52%. Found: C, 56.56, 56.70; H, 3.42, 3.42; N, 5.93, 5.94; S, 20.04, 19.83%.

(B) Mildew tests

With 1000 p.p.m. of the compound of Example IV(A) in aqueous suspension, 92.5% control of powdery mildew on cucumbers was obtained. Test plants were sprayed after growing one week and observations were made one week after spraying.

(C) Post-emergence herbicide tests

Applied as an aqueous spray at 20 pounds per acre, the compound of Example IV(A) showed 100% control of one week old pigweed and mustard. At 10 pounds per acre, this compound showed no effect on soybeans and little effect on corn.

EXAMPLE V

A suitable powder nematocidal formulation is prepared by blending active ingredient with inert powder carrier, wetting agent, and dispersant, and then grinding the mixture in an impact mill to an average particle size below about 50 microns. The mixture is reblended until completely homogeneous.

|  | Parts |
|---|---|
| Compound of Example I(A) | 75 |
| Sodium salt of alkylated naphthalene sulfonic acid | 2 |
| Methyl cellulose, low viscosity | 0.25 |
| Disodium phosphate | 3 |
| Attapulgite clay | 19.75 |

This powder formulation, when dispersed in water, is applied with conventional spray equipment at a spray concentration of about 5 pounds wettable powder per 10 gallons of water at a rate between 10 and 100 pounds active ingredient per acre of land infested with pathogenic nematodes. The chemical is then worked into the soil. Cucumbers grown in this soil show normal development free from nematode infection.

EXAMPLE VI

A suitable aqueous suspension is prepared by mixing the active ingredient with the other ingredients listed, and then wet milling the mixture. The resulting liquid is a thixotropic non-settling suspension.

|  | Parts |
|---|---|
| Product of Example II(A) | 30 |
| Sodium lignosulfonate | 15 |
| Florida fuller's earth | 3.5 |
| Low viscosity methyl cellulose | 0.4 |
| Disodium phosphate | 1.0 |
| n-Octyl alcohol | 0.1 |
| Water | 50.0 |

This suspension mixes readily with water to form substantially non-flocculating aqueous dispersions which are suitably applied using conventional spray equipment at a rate of 10 to 50 pounds of active agent per acre. Substantially complete control of nematodes is obtained.

EXAMPLE VII

The following emulsifiable oil composition is prepared by blending active ingredient, wetting agent and oil together until a completely homogeneous mixture is obtained.

|  | Parts |
|---|---|
| Product of Example III(A) | 30 |
| Polyoxyethylene sorbitan trioleate | 10 |
| Stoddard solvent | 60 |

This composition when poured into water, disperses to form an emulsion suitable for application as a spray. When diluted at the rate of 1 part composition to 5 parts water and applied at the rate of 40 gallons of active ingredient per acre, substantially complete control of nematodes is obtained.

EXAMPLE VIII

A dust nematocidal composition is prepared by blending the active ingredient with the other diluents and micropulverizing the mix to an average particle size less than 50 microns. The resulting mixture is suitable for use with ordinary dusting equipment.

|  | Parts |
|---|---|
| Product of Example IV(A) | 15 |
| Diatomaceous silica | 12 |
| Pyrophyllite | 70 |
| Lauryl alcohol | 3 |

EXAMPLES IX–XIX

Substantially equivalent results are obtained when the procedure of Example VII is repeated substituting for the product of Example III(A), one or more of the following examples:

IX—N,N'-Sulfonyl bis(m-cresyl carbamate)
X—N,N'-Sulfonyl bis(m-cresyl thiocarbamate)
XI—N,N'-Sulfonyl bis(2-chlorophenyl carbamate)
XII—N,N'-Sulfonyl bis(3-nitrophenyl thiocarbamate)
XIII—N,N'-Sulfonyl bis(1-naphthyl thiocarbamate)
XIV—N,N'-Sulfonyl bis(2-naphthyl carbamate)
XV—N,N'-Sulfonyl bis(2,4-dibromo-1-naphthyl carbamate)
XVI—N,N'-Sulfonyl bis(5-nitro-2-naphthyl thiocarbamate)
XVII—N,N'-Sulfonyl bis(2-phenanthryl thiocarbamate)
XVIII—N,N'-Sulfonyl bis(9-phenanthryl thiocarbamate)
XIX—N,N'-Sulfonyl bis(p-phenylphenyl thiocarbamate)

What is claimed is:

1. N,N'-sulfonyl bis(aryl carbamates) having the formula $SO_2(NH.COXA)_2$ where X is oxygen or sulfur and A is monovalent aryl.

2. N,N'-sulfonyl bis(aryl carbamates) as claimed in claim 1 where said monovalent aryl is phenyl and X is oxygen.

3. N,N'-sulfonyl bis(aryl carbamates) as claimed in claim 1 where said monovalent aryl is 1-naphthyl and X is oxygen.

4. N,N'-sulfonyl bis(aryl carbamates) as claimed in claim 1 where said monovalent aryl is 2-naphthyl and X is oxygen.

5. N,N'-sulfonyl bis(aryl carbamates) as claimed in claim 1 where said monovalent aryl is phenyl and X is sulfur.

6. N,N'-sulfonyl bis(aryl carbamates) as claimed in claim 1 where said monovalent aryl is 1-naphthyl and X is sulfur.

7. N,N'-sulfonyl bis(aryl carbamates) as claimed in claim 1 where said monovalent aryl is 2-naphthyl and X is sulfur.

References Cited

Onodera: "Chem. Abstracts" vol. 57, p. 14932 (1962).

CHARLES B. PARKER, *Primary Examiner.*

D. R. PHILLIPS, *Assistant Examiner.*

U.S. Cl. X.R.

260—471; 71—100, 111; 424—300